US007907562B2

(12) United States Patent
Murty et al.

(10) Patent No.: US 7,907,562 B2
(45) Date of Patent: Mar. 15, 2011

(54) MANAGING DENSE WIRELESS ACCESS POINT INFRASTRUCTURES IN WIRELESS LOCAL AREA NETWORKS

(75) Inventors: Rohan N Murty, Cambridge, MA (US); Ranveer Chandra, Kirkland, WA (US); Jitendra D. Padhye, Redmond, WA (US); Alastair Wolman, Seattle, WA (US); Brian D. Zill, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 11/766,013

(22) Filed: Jun. 20, 2007

(65) Prior Publication Data
US 2008/0316982 A1    Dec. 25, 2008

(51) Int. Cl.
H04M 1/00    (2006.01)
(52) U.S. Cl. .......... 370/328; 370/338; 455/410; 455/421
(58) Field of Classification Search .......... 370/338, 370/310, 328, 329, 330, 331; 455/423.3, 455/434, 433, 435.1, 420, 410, 411, 421
See application file for complete search history.

(56) References Cited

U.S. PATENT DOCUMENTS

| 7,200,112 | B2 | 4/2007 | Sundar et al. | |
|---|---|---|---|---|
| 7,236,786 | B2 | 6/2007 | Shen et al. | |
| 7,477,894 | B1 * | 1/2009 | Sinha | 455/432.1 |
| 7,480,264 | B1 * | 1/2009 | Duo et al. | 370/310.2 |
| 7,734,280 | B2 * | 6/2010 | Eastlake, III | 455/411 |
| 2002/0085719 | A1 * | 7/2002 | Crosbie | 380/248 |
| 2003/0095663 | A1 | 5/2003 | Nelson et al. | |
| 2003/0171115 | A1 | 9/2003 | Batra et al. | |
| 2004/0109472 | A1 * | 6/2004 | Choyi et al. | 370/466 |
| 2004/0143681 | A1 | 7/2004 | Benveniste | |
| 2004/0198228 | A1 | 10/2004 | Whelan et al. | |
| 2004/0203593 | A1 | 10/2004 | Whelan et al. | |
| 2005/0003827 | A1 | 1/2005 | Whelan | |
| 2005/0083843 | A1 | 4/2005 | Pinault | |
| 2005/0124340 | A1 | 6/2005 | Giesberts et al. | |
| 2005/0220019 | A1 * | 10/2005 | Melpignano | 370/232 |
| 2006/0056448 | A1 | 3/2006 | Zaki et al. | |
| 2006/0072502 | A1 | 4/2006 | Crandall et al. | |
| 2006/0088020 | A1 * | 4/2006 | Gass | 370/338 |
| 2006/0092889 | A1 | 5/2006 | Lyons et al. | |

(Continued)

OTHER PUBLICATIONS

Parsa, "Evolution of WLAN Systems", at<<http://www.ortronics.com/us/tools/download/?dfp=art&dfn=WLAN_Evolution.pdf>>, Jun. 7, 2006, Ortronics/Legrand, 2006, 6 pgs.

(Continued)

Primary Examiner — Jean A Gelin
(74) Attorney, Agent, or Firm — Lee & Hayes, PLLC

(57) ABSTRACT

Techniques for enhancing the throughput capacity available to client devices connected to a wireless local area network (WLAN) are described. Specifically, existing WLAN resources are converted into wireless access points (APs) to create a dense infrastructure of wireless APs. To leverage this dense AP infrastructure, central management techniques are employed. With client-to-AP mapping, these techniques are used to prevent the discovery of multiple APs in a WLAN by a client device and to select a single AP (using certain policies) to associate with the client device and provide it with an enhanced wireless connection to the WLAN. Additionally, techniques are employed to centrally determine, using central policies, when the AP should disassociate from the client device and when another centrally selected AP should respond to, and associate with, the client device to provide it with an enhanced wireless connection to the WLAN—without interrupting/disrupting the client device's access.

20 Claims, 5 Drawing Sheets

U.S. PATENT DOCUMENTS

| | | | |
|---|---|---|---|
| 2006/0135066 A1 | 6/2006 | Banerjea | |
| 2006/0171388 A1* | 8/2006 | Ikeda | 370/389 |
| 2006/0200862 A1 | 9/2006 | Olson et al. | |
| 2006/0209758 A1 | 9/2006 | Qiang et al. | |
| 2006/0217067 A1 | 9/2006 | Helbig | |
| 2007/0008889 A1 | 1/2007 | Seo | |
| 2007/0025306 A1 | 2/2007 | Cox et al. | |
| 2007/0049319 A1 | 3/2007 | Hart et al. | |
| 2007/0076657 A1 | 4/2007 | Woodings et al. | |
| 2007/0117558 A1* | 5/2007 | Balwani | 455/421 |
| 2007/0208847 A1* | 9/2007 | Knauerhase et al. | 709/223 |
| 2008/0014934 A1* | 1/2008 | Balasubramanian et al. | 455/434 |
| 2008/0096575 A1* | 4/2008 | Aragon et al. | 455/453 |
| 2008/0259882 A1* | 10/2008 | Abdel-Kader et al. | 370/338 |

OTHER PUBLICATIONS

"Rethinking the Access Point: Dense Deployments for Wireless LANs", at <<http://mithras.itworld.com/download/book_chapters_and_wps/farpoint/091004_dense_deployment_wlans.pdf>>, Farpoint Group, Aug. 2004, 8 pgs.

Sundaresan, et al., "The Need for Cross-Layer Information in Access Point Selection Algorithms", at <<http://www.imconf.net/imc-2006/papers/p25-sundaresan.pdf>>, ACM, 2006, Oct. 25-27, 2006, 6 pgs.

Akella, et al., "Self-Management in Chaotic Wireless Deployments", available at least as early as May 9, 2007, at <<http://www.cs.cmu.edu/afs/cs/project/cmcl/archive/2005/mobicomchaotic.pdf>>, ACM, 2005, pp. 15.

Bahl, et al., "DAIR: A Framework for Managing Enterprise Wireless Networks Using Desktop Infrastructure", available at least as early as May 9, 2007, at <<http://www.sigcomm.org/HotNets-IV/papers/wireless_26.pdf>>, pp. 6.

Mathias, "Pack in those access points; here come WLAN dense deployments", retrieved on May 11, 2007, at <<http://www.computerworld.com/action/article.do?command=viewArticleBasic&articleId=9001188&source=NLT_MW&nlid=43>>, pp. 2.

"Wireless LAN System features tripled capacity", retrieved on May 11, 2007, at <<http://news.thomasnet.com/fullstory/475745/148>>, Thomas Publishing Company, 2007, pp. 5.

PCT Search Report for PCT Application No. PCT/US2008/066340, mailed Sep. 24, 2008 (10 pages).

PCT Search Report for PCT Application No. PCT/US2008/066325, mailed Oct. 14, 2008 (10 pages).

\* cited by examiner

MANAGING DENSE WIRELESS ACCESS POINT INFRASTRUCTURES IN WIRELESS LOCAL AREA NETWORKS

RELATED APPLICATION

This application is related to U.S. application Ser. No. 11/766,045, filed 20 Jun. 2007, entitled "Management Policies for Dense Wireless Access Point Infrastructures in Wireless Local Area Networks", which is incorporated by reference herein.

BACKGROUND

Networked environments allow network users to share network resources such as printers, data base servers, e-mail servers and the like. Unfortunately, traditional wired networks, such as wired local area networks (LANs), can present significant limitations with respect to providing access to mobile client devices because they require that these mobile devices be physically connected to the network. Accordingly, wireless LANs (WLANs) are becoming increasingly popular, especially those based on the wireless standards developed by the Institute of Electrical and Electronics Engineers (IEEE) and designated IEEE 802.11. These WLANs provide mobile client devices with wireless access from any location within range of one or more access points (AP) associated with the WLAN. In this way, mobile client devices can access a WLAN, and potentially one or more backhaul networks (wired and/or wireless mesh) or wireless networks linked to the WLAN, without being physically connected to the network. This is advantageous, especially since mobile client devices, such as laptops, smartphones, personal digital assistant (PDA) phones and the like, with wireless functionality are fast becoming ubiquitous. As such, it is not surprising that increasing the throughput capacity provided by APs associated with WLANs is an ongoing concern.

Unfortunately, traditional approaches directed to increasing WLAN throughput capacity are not optimal. Specifically, these approaches typically focus on the amount of space being covered ("coverage") and only treat the throughput capacity ("capacity") as a secondary concern. This is at least partly due to the fact that increasing the capacity of WLANs is often prohibitively expensive. For instance, increasing capacity by increasing the density of APs can be impractical given the hardware and/or software costs typically associated with procuring a large number of APs. For these reasons, enterprises deploying WLANs tend to only deploy the minimum number of WLAN APs necessary to achieve the desired coverage. Furthermore, even when enterprises do deploy more WLAN APs, thus increasing the AP density of the WLAN, they still do not achieve significant increases in throughput capacity because they fail to fully leverage the potential advantages associated with this density by employing effective spectrum utilization techniques.

Accordingly, there is a need to significantly enhance the overall throughput capacity available to client devices connected to a WLAN by increasing the AP density on the WLAN and by successfully leveraging this density through effective spectrum utilization techniques.

SUMMARY

Techniques for enhancing the throughput capacity available to client devices, such as mobile computing devices connected to a wireless local area network (WLAN), are described. In at least some embodiments, existing WLAN resources are converted into wireless access points (APs) to create a dense infrastructure of wireless APs. To leverage the potential throughput capacity advantages of this dense AP infrastructure, certain central management techniques are employed to manage AP communication channel assignments, AP transmission power settings and client-to-AP mappings.

With respect to client-to-AP mapping, in at least some embodiments, central management techniques are employed to prevent discovery of multiple APs in a WLAN by a client device in wireless range of the multiple APs. A single AP is centrally selected from among the multiple APs using certain policies, and is directed to respond to, and associate with, the client device. Through this central control, the client-to-AP mapping effectively allocates wireless connections to the WLAN among client devices to provide enhanced throughput capacity.

In addition, in at least some embodiments, central management techniques are employed to centrally determine, using certain policies, when the selected AP providing the client device with a wireless connection to the WLAN should disassociate from the client device. These techniques are also employed to centrally determine, using certain policies, when another centrally selected AP should respond to, and associate with, the client device to provide the client device with a wireless connection associated with an enhanced throughput capacity. Advantageously, this can be accomplished without interrupting/disrupting the client device's access. In the context of the WLAN as a whole, these handoff techniques provide an effective load balancing approach.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Figure 1:
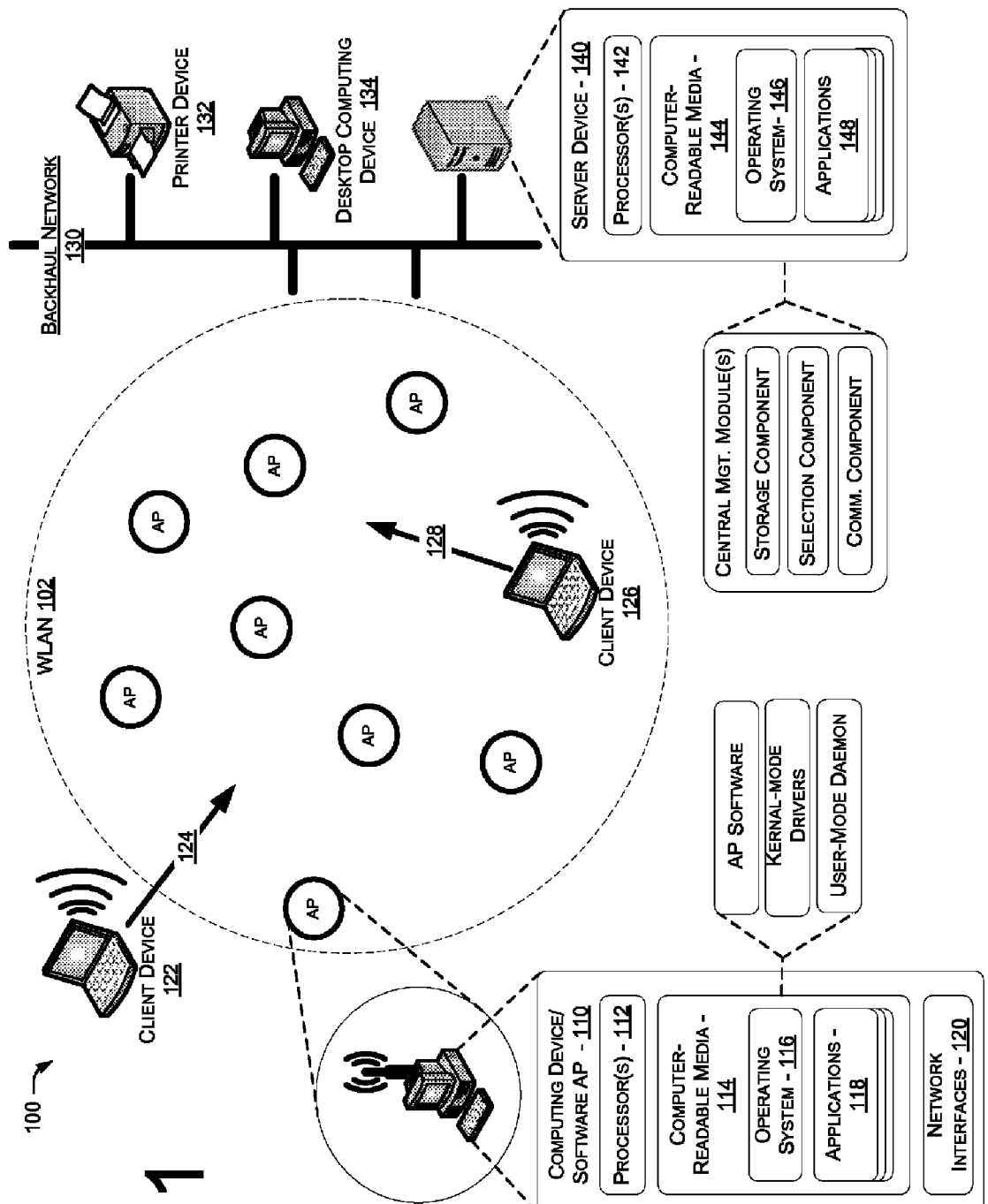
FIG. 1 illustrates an exemplary system for implementing the disclosed techniques, in accordance with at least one embodiment.

This disclosure is directed to techniques for increasing the throughput capacity available to client devices, such as mobile devices, connected to a wireless local area network (WLAN). These techniques generally involve (1) configuring existing computing resources, such as desktop computers and the like, into wireless access points (AP) to create a dense AP WLAN infrastructure, and (2) leveraging this dense AP infrastructure to enhance data throughput capacity on the WLAN by centrally managing AP communication channel assignments (e.g., one of several non-overlapping channels defined by the IEEE 802.11 standards), AP transmission power settings (tuning the power at which an AP transmits data) and client-to-AP mappings for client devices attempting to connect to the WLAN.

With respect to (1), configuring existing computing resources into wireless access points (APs) to help create a dense AP WLAN infrastructure, any number of APs capable of being configured automatically from a central location, such as a central server on the WLAN, can be utilized. In this regard, and as will be appreciated and understood by one skilled in the art, certain techniques—such as those described in Patent Application Publication Numbers US2004/0103278, filed Nov. 27, 2002, and US2006/0274792, filed Aug. 15, 2006, both of which are assigned to Microsoft Corporation in Redmond, Wash.—can be employed to transform existing computing devices (such as desktop personal computers, servers, laptops and the like) having a reasonably stable connection to a backhaul network (typically wired and/or wireless network mesh), such as a LAN for example, into wireless software APs forming all or part of a WLAN. One example of such a WLAN is as a WLAN following Institute of Electrical and Electronics Engineers (IEEE) 802.11 communication standards.

Utilizing these techniques, the density of a WLAN infrastructure can be increased without modifying any client devices configured to access the WLAN. This dense WLAN infrastructure can include any number of transformed and/or dedicated APs. Typically, transforming an existing WLAN computing device into a software AP does not interfere with the device's functionality. Instead, the existing computing device is updated with fully programmable software which provides a way to bridge interfaces between two networks on the device. More specifically, the existing computing device typically utilizes an Ethernet network interface card (NIC) to provide a reasonably stable connection to the network. In addition, a relatively inexpensive wireless adapter (such as a USB-based wireless adapter for example) is attached to the device to provide it with a wireless connection to a WLAN. As such, by virtue of this fully programmable software, the device is effectively configured as a software AP providing a link between the backhaul network (e.g., a wired and/or wireless mesh LAN) and the WLAN.

While any suitable technique(s)/software for creating software APs on computing devices can be employed, certain software modifications can be made to facilitate the techniques disclosed herein. Specifically, as described below in greater detail below, these modifications include two kernel-mode level drivers and a user-mode level daemon to provide certain data transmission (sending and receiving) functionality, certain AP functionality, and certain central control functionality—all of which accommodate the disclosed central management techniques.

With respect to (2), centrally managing features such as AP communication channel assignments, AP transmission power settings and client-to-AP mappings allows the dense AP infrastructure to be leveraged because it allows coordinated decisions with respect to these features to be made in the context of the WLAN infrastructure as a whole. In this regard, these features can dramatically affect the throughput capacity available on that same AP, or even on another AP. By centrally managing these features—based on an "infrastructure-wide" view of available resources—assignments, settings and mappings that enhance the throughput capacity enjoyed by client devices accessing the WLAN can be intelligently identified and selected. Advantageously, this can be accomplished without modifying the client devices themselves.

With respect to client-to-AP mapping in particular, the ongoing intelligent mapping of client devices to APs by one or more central controllers (i.e., central management module(s)) can dramatically improve throughput capacity. Based on information collected from all of the APs, an "infrastructure-wide" perspective can be leveraged to intelligently map APs based on factors such as physical distance between APs, AP signal strength, load on each AP and interference based conflict graphs. Take, for example, a scenario in which six client devices are placed in a conference room with two APs such that all of the client devices are more proximate to one AP than the other. In such a scenario, the overall throughput enjoyed by each client device can be significantly enhanced by having a central controller (with an "infrastructure-wide" view) coordinate the client-to-AP mapping for each AP. Specifically, by intelligently mapping half of the client devices to the more proximate AP and half to the less proximate AP, the throughput capacity available to each client device is optimized. Such a result may not be realized if each client device were allowed to determine for itself which AP it is to associate with (and therefore effectively be assigned to). Specifically, in the above scenario, an individual client device lacking an "infrastructure-wide" view would unilaterally select an AP based on a narrow "client-centric" metric, such as the APs relative proximity (which typically correlates with the strongest signal strength). As such, all six of the client devices in the above scenario would likely select the more proximate AP—thus decreasing the overall throughput available to each client device.

As noted above, in at least some embodiments, intelligent client-to-AP mapping techniques directed to enhancing AP throughput capacity include centrally preventing a client device from discovering APs in a WLAN. A single AP is then centrally selected, using certain policies, and directed to respond to, and associate with, the client device to provide it with a wireless connection to the WLAN that is associated with an enhanced throughput capacity. Furthermore, to deal with connectivity changes in the WLAN (e.g., from moving client devices), these techniques also include centrally determining, using certain policies, when the selected AP providing the client device with a wireless connection to the WLAN should disassociate from the client device and when another centrally selected AP should respond to, and associate with, the client device to provide the client device with a wireless connection associated with an enhanced throughput capacity. Advantageously, this can be accomplished without interrupting/disrupting the client device's access. In the context of the WLAN as a whole, these handoff techniques provide an effective load balancing approach.

Multiple and varied implementations and embodiments are described below. Generally, any of the functions described with reference to the figures can be implemented using software, firmware (e.g., fixed logic circuitry), manual processing, or a combination of these implementations. The term, "module", "component" or "functionality" as used herein generally represents software, firmware, or a combination of software and firmware. For instance, in the case of a software implementation, the term" "module" or "functionality" represents program code (or declarative content) that performs specified tasks when executed on a processing/computing device or devices (e.g., CPU or CPUs). The program code can be stored in one or more computer readable memory devices. More generally, the illustrated separation of modules, components and functionality into distinct units may reflect an actual physical grouping and allocation of such software and/ or hardware, or can correspond to a conceptual allocation of different tasks to one or more software program(s) and/or hardware unit(s), or any combination thereof. The illustrated modules, components and functionality can be located at a single site (e.g., as implemented by a processing/computing device), or can be distributed over multiple locations (e.g., as implemented by multiple processing/computing devices).

Exemplary System

FIG. 1 illustrates an exemplary system 100 for implementing the disclosed techniques directed to enhancing the throughput capacity on a WLAN. It is to be appreciated that computing environment 100 is but one example of a suitable computing environment and is not intended to suggest any limitation as to the scope of use or functionality of the system. As such, the various described embodiments can be operational with numerous other general purpose or special purpose computing system environments or configurations. Neither should computing environment 100 be interpreted as having any dependency or requirement relating to any one or combination of components illustrated therein.

System 100 includes WLAN 102 which wirelessly links multiple computing devices within a coverage area by allowing the devices to communicate wirelessly using known modulation techniques, as will be understood and appreciated by one skilled in the art. While WLAN 102 can be based on any suitable wireless standard, in at least some embodiments WLAN 102 follows wireless standards developed by the Institute of Electrical and Electronics Engineers (IEEE) and designated IEEE 802.11.

As noted above, WLAN 102 wirelessly links multiple computing devices within a coverage area. To accomplish this, WLAN 102 includes multiple wireless access points (APs) (i.e., nodes), each having a certain wireless transmission range. The combined range of these APs defines the coverage area provided by WLAN 102.

Due to the physical constraints of the page upon which this figure appears, most of the APs included in WLAN 102 are here depicted by a circle designated "AP". For the sake of clarity, WLAN 102 is depicted here as including eight APs. However, it is to be appreciated and understood that WLAN 102 can include any number of APs without deviating from the course and scope of the claimed subject matter. In this regard, the number of APs included in WLAN 102 can be thought of as correlating with the AP density of WLAN 102.

While some of the APs included in WLAN 102 can be traditional dedicated APs, WLAN 102 includes multiple existing computing devices, such as desktop computing devices and the like, that have been configured or transformed as software APs. As noted above, this provides a relatively inexpensive way to increase the AP density, and thus the overall throughput capacity of WLAN 102 without requiring any modifications to client devices. One such device configured as a software AP is illustrated as computing device/software AP 110 which includes one or more processors 112 and one or more computer-readable media 114. One or more computer-readable media 114 in turn includes operating system 116 and one or more software applications 118, both of which are executable by processor(s) 112. Applications 118 can comprise any suitable type of applications. As such, although computing device/software AP 110 is configured to provide a software AP, it is still a fully functional computing device having the same computing functionality as it did prior to being transformed into a software AP. Although computing device/software AP 110 is illustrated in the form of a desktop computer, it is to be appreciated and understood that other computing devices can be utilized without departing from the spirit and scope of the claimed subject matter. Other computing devices can include, by way of example and not limitation, portable computers, handheld computers such as personal digital assistants (PDAs), cell phones, tablet computers, smart phones and the like.

Also included in computer-readable media 114, and executable by processors 112, is certain software associated with providing computing device/software AP 110 with software AP functionality. In addition, as noted above, two kernel-mode level drivers and a user-mode level daemon is included to provide certain functionality for centrally managing the multiple APs in WLAN 102, as described in more detail below.

Computing device/software AP 110 also includes at least two network interfaces 120, one of which is connected to backhaul network 130, described below, and one wirelessly connected to WLAN 102. Specifically, with respect to the interface connected to backhaul network 130, typically an Ethernet-based network interface card (NIC) is attached to computing device/software AP 110 to provide it with a relatively stable backhauled connection. With respect to the interface connected to WLAN 102, typically a relatively inexpensive wireless adapter (such as a USB-based wireless adapter for instance) is attached to the device to provide it with a wireless connection to WLAN 102.

Continuing, system 100 includes multiple mobile client devices which are configured to wirelessly access WLAN 102 via the multiple APs. For the sake of clarity, only two mobile client devices, client device 122 and client device 126, are depicted here. However, it is to be appreciated and understood that system 100 can include any number of mobile client devices, and/or any number of non-mobile client devices, without deviating from the course and scope of the claimed subject matter. Furthermore, although devices 122 and 126 are illustrated in the form of mobile laptop computers, it is to be appreciated and understood that other computing devices can be utilized without departing from the spirit and scope of the claimed subject matter. Other computing devices can include, by way of example and not limitation, portable computers, handheld computers such as personal digital assistants (PDAs), cell phones, tablet computers, smart phones and the like capable of wirelessly connecting to WLAN 102.

By virtue of the fact that at least some of the client devices in system 100 are mobile, the connectivity environment in WLAN 102 is dynamic in that it can dramatically change over time. For instance, any number of client devices can move into or out-of range of WLAN 102 (i.e., into or out-of range of one or more of the APs in WLAN 102) at any time. In addition, any number of client devices can move to various positions within range of WLAN 102 at any time—thus dynamically changing the number and proximity of client devices with respect to any particular AP. The dynamic character of WLAN 102 is illustrated with respect to client device 122, which is shown moving from a position that is not within range of WLAN 102 to a position that is within range of WLAN 102—as indicated by arrow 124. Similarly, client device 126 is shown moving between two positions within range of WLAN 102—as indicated by arrow 128.

System 100 also includes a backhaul network (typically wired and/or wireless network mesh), such as a local area network (LAN) or the like, depicted here as backhaul network 130. Backhaul network 130 communicatively links any number of networked resources such as, without limitation, printer devices (one of which is shown here as printer device 132), desktop computing devices (one of which is shown here as desktop computing device 134) and server devices (one of which is shown here as server device 140). In addition, backhaul network 130 can be communicatively linked (i.e., coupled) with any number of other backhauled and/or wireless networks, including without limitation LANS, WANs, the internet and the like. In this regard, backhaul network 130 is communicatively linked with WLAN 102 via each of the APs in WLAN 102. Recall that each of these APs, in turn, is configured to provide one or more client devices, such as mobile client devices 122 and 126, with wireless access to WLAN 102. As such, each AP effectively provides a communicative bridge between client devices, WLAN 102, backhaul network 130 (including any networked resources thereon) and any other backhauled and/or wireless networks communicatively linked with Backhaul network 130 or WLAN 102.

As discussed in further detail below, by virtue of each AP being communicatively linked to backhaul network 130, information can be transferred between each AP and server device 140. As such, server device 140 can be configured to collect information from each AP and centrally manage each AP with respect to each AP's communication channel assignment, transmission power setting(s) and/or client device-to-AP mapping. Server device 140 may be implemented as one or more of a variety of suitable computing devices, including, for example, servers, desktop PCs, notebooks or portable computers, workstations, mainframe computers, and the like. Server device 140 includes one or more processors 142 and one or more computer-readable media 144. In addition, residing on computer-readable media 144 is operating system 146 and one or more software server applications 148, both of which are executable by processor(s) 142.

Included, at least in part, on server device 140 is at least one central management module (i.e., central controller(s)) responsible for centrally managing each AP associated with WLAN 102 with respect to each AP's communication channel assignment, transmission power control setting(s) and/or client device-to-AP mappings mapping, as described briefly above. This central management module(s) includes, without limitation, (1) a storage component to store information received from one or more of the APs associated with WLAN 102, (2) a selection component to process the information and select certain communication channel assignments, transmission power controls settings and/or mappings for each AP and (3) a communication module to configure the APs with the selected assignments, settings and/or mappings.

Recall from above that server device 140 may be implemented as one or more of a variety of suitable computing devices. Also, recall that modules and components can correspond to a conceptual allocation of different tasks to one or more software program(s) and/or hardware unit(s), or any combination thereof. In this regard, modules such as the central management module(s) and components such as the storage, selection and communication components, can be distributed at/over a single site (e.g., as implemented by a processing/computing device), or can be distributed over multiple locations (e.g., as implemented by multiple processing/computing devices). As such, in at least some embodiments, one or more tasks associated with the central management module's duties (i.e., centrally managing) can be performed in a distributed fashion by one or more of the APs in WLAN 102.

Exemplary Software AP Network Stack

As will be understood and appreciated by those skilled in the art, computing device/software AP 110 above includes a network stack (i.e., communications stack) which can be thought of as an abstract description for the device's communications and computer network protocol design. In the context of the software associated with providing computing device/software AP 110 with software AP functionality, this network stack can be thought of as including the two kernel-mode level drivers and the user-mode level daemon depicted in FIG. 1.

Figure 2:
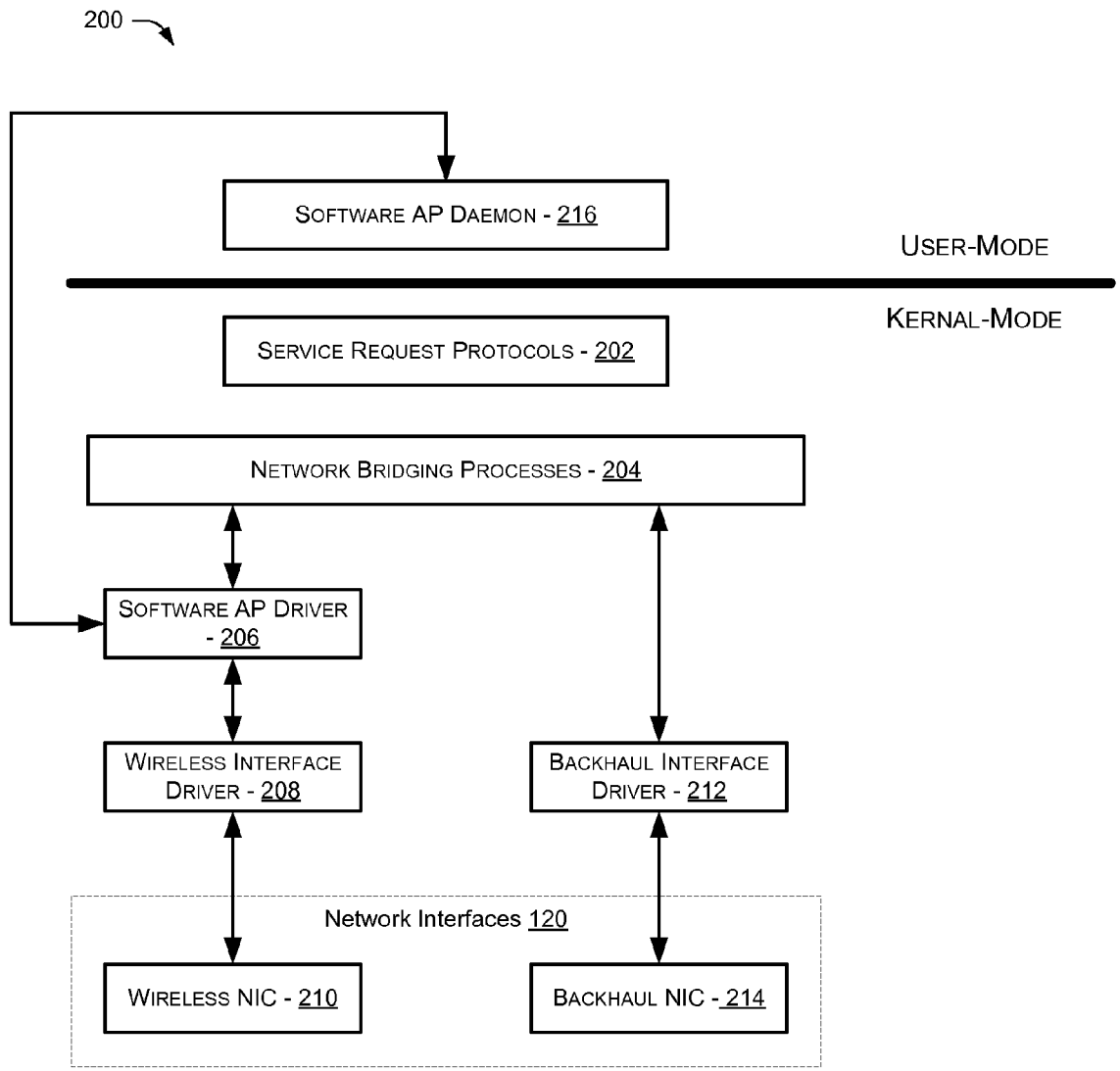
FIG. 2 illustrates an exemplary network stack, in accordance with at least one embodiment.

In this regard, FIG. 2 illustrates an exemplary network stack 200 which, for discussion purposes, describes the software associated with providing computing device/software AP 110 with software AP functionality. While exemplary network stack 200 is described in the context of system 100 above, it is to be appreciated and understood that this constitutes but one example and is not to be used to limit the application of the claimed subject matter.

Recall from above that configuring or transforming existing computing resources, such as desktop computing devices and the like, on WLAN 102 provides a relatively inexpensive way to increase the AP density, and thus the overall throughput capacity, of WLAN 102. Also recall that in addition to the AP software responsible for creating a wireless software AP on computing device/software AP 110, certain kernel-mode level drivers and a user-mode level daemon are included in the network stack of computing device/software AP 110. As such, and as will be appreciated and understood by one skilled in the art, network stack 200 illustrates, in the context of the open systems interconnection (OSI) model, certain layers included in the network stack of computing device/software AP 110. In this regard, these layers are depicted as being associated with either a user-mode or a kernel mode with respect to operating system 116 on computing device/software AP 110.

Network stack 200 enables AP functionality on computing device/software AP 110, which can run any suitable software, such as Microsoft's Windows® Vista® operating system in at last some embodiments. An integral part of network stack 200 is a fully programmable AP software code. Recall that this fully programmable AP software provides a way to bridge the backhauled (wired and/or wireless mesh) and wireless interfaces between two networks on the device. As will be appreciated and understood by one skilled in the art, this bridging is made possible by the use of certain service request protocols 202 (such as transmission control protocol (TCP) and the Internet Protocol (IP) protocols for instance) and network bridging processes 204 which accommodate the use of communication standards developed by the IEEE for use with wired and wireless networks (e.g., 802.3 and 802.11 IEEE standards).

With respect to the kernel-mode drivers in network stack 200, Software AP driver 206 and wireless interface driver 208 are closely associated with the wireless NIC 210, which is included in network interfaces 120. For purposes of this discussion, wireless NIC 210 can be thought of as a hardware component attached to computing device/software AP 110 which (1) physically allows computing device/software AP 110 to wirelessly communicate with WLAN 102 and (2) provides a low-level addressing system through the use of media access control (MAC) messages, as will be understood and appreciated by one skilled in the art. In this regard, wireless interface driver 208 communicates directly with wireless NIC 210 and facilitates the transmission of data sent to, and from, computing device/software AP 110. In particular, wireless interface driver 208 exposes interfaces such that certain AP functions, such as associating with client devices, authenticating client devices and the like can be handled by software AP driver 206.

Software AP driver 206 driver sits between the second and third layers of the OSI model—and can thus be thought of as establishing a mid-layer between these layers with respect to the data transferred between wireless interface driver 208 and network bridge processes 204. It is at this mid-layer that most of the AP functionality, such as association, authentication, rate control, handoffs, packet routing, and the like is implemented. This mid-layer also exposes AP functionality to user-level code via input/output control (ioctl) calls, as will be appreciated and understood by one skilled in the art. This permits a user-mode level daemon (i.e., computer program that runs in the background), such as software AP daemon 216 described below, to accommodate information requests and/or receive and execute commands from the central management module(s) on server device 140. Software AP driver 206 includes, without limitation, the following features (this is not an exhaustive list):

Supports IEEE 802.11a and 802.11g wireless communication standards.

Supports access control lists (ALC) lists which, as described in detail below, are maintained by the software AP on computing device/software AP 110 and are used by the central management module to prevent client devices from discovering the software AP on computing device/software AP 110.

Supports the configuration of the software AP's transmission power control, according to 802.11 a/b/g standards, by the central management module on server device 140.

Allows the software AP on computing device/software AP 110 to intercept and capture "interesting" packets such as gratuitous address resolution protocol (ARP) requests, dynamic host configuration protocol (DHCP) requests/replies and the like, as will be appreciated and understood by one skilled in the art.

Includes one or more application programming interfaces (API) that expose access point functionality to the user-level code. This is intended to provide a significant degree of control and flexibility to the user-level programs (e.g., user-mode level services such as software AP daemon 216 described below).

Supports certain security schemes for wireless networks, such as Wired Equivalent Privacy (WEP), WPA, 802.1x, and the like.

Similar to wireless interface driver 208 being closely associated with wireless NIC 210, backhaul interface driver 212 is closely associated with backhaul NIC 214, which is included in network interfaces 120. For purposes of this discussion, backhaul NIC 214 can be thought of as a hardware component attached to computing device/software AP 110 which (1) physically allows computing device/software AP 110 to communicate with backhaul network 130 and (2) provides a low-level addressing system through the use of MAC messages, as will be understood and appreciated by one skilled in the art. In this regard, backhaul interface driver 212 communicates directly with backhaul NIC 214 and facilitates the transmission of data sent to, and from, computing device/software AP 110.

With respect to the user-mode in network stack 200, software AP daemon 216 is a user-mode level service responsible for the following functions:

Carrying out directions (from the central management module(s)) on server device 140 directed to centrally managing the software AP on computing device/software AP 110. By way of example and not limitation, these directions can include: setting the AP to a particular communication channel, modifying (i.e., amending) the access control list (ACL) maintained by the software AP—as described below, modifying the AP's transmission power setting(s), and performing certain association and/or handoff procedures as described below.

Periodically reporting (to the central management module(s)) software AP-specific information. By way of example and not limitation, this information can include: an updated list of client devices currently associated with the software AP, the air-time utilization for each client device currently associated with the software, current communication channel settings for the software AP, and current transmission power settings for the software AP.

WLAN Associations

As noted above, the described techniques are directed to enhancing the throughput capacity available to client devices, such as mobile devices, connected to a wireless local area network (WLAN). Accordingly, an exemplary process for implementing these techniques is described in the discussion below. This discussion assumes that the reader is familiar with the various communicative processes associated with WLANs in general, and 802.11 WLANs in particular. Nevertheless, the following overview description of associations in 802.11 WLANs is included to facilitate the reader in understanding this discussion. For the purposes of this discussion, associating can be considered the process by which a client becomes communicatively linked to an AP (i.e., client-to-AP mapping), via a particular communication channel, to access the WLAN, and potentially any networks communicatively linked to the WLAN—such as WANs, wired LANS, the internet and the like An AP, by convention, broadcasts beacon signals periodically. The beacon frame is a management frame containing information specific to the AP, such as service set identifier (SSID), data rates supported, timestamp, and certain capability information. Beacons serve two primary purposes: (1) advertising the WLAN and (2) facilitating power saving mode client devices. When initiating association with a particular AP, a client device broadcasts a probe request which includes a desired network SSID and a MAC address identifying the client device. If the SSID is set to "ANY", then by convention, the client is attempting to discover APs within its wireless range. Typically, as opposed to the techniques disclosed herein, APs automatically respond to such requests by default. As such, APs that reply to such probe request messages are discovered by the client devices sending (unicasting) the messages. When an AP replies to a probe request message, it typically does so by sending a probe response message—which then initiates the association process with a client.

Typically, a client listens to the beacon frames broadcasted by various APs and then transmits a probe request to a particular AP it wants to associate with. An AP receiving such a message checks to see if recognizes the SSID (or it is set to "ANY"). If so, as noted above, the AP replies with a probe response message—which is unicast by the AP. This probe response message can be considered an indication of the AP's willingness to serve the client device. After associating with the AP, the client device may send out a DHCP request to lease an internet protocol (IP) address (typically from a DHCP server associated with the WLAN and/or networks communicatively linked to the WLAN, such as a backhaul network) which it registers with the WLAN (typically via a communication server on the WLAN). As will be appreciated and understood by one skilled in the art, DHCP is a set of rules that dynamically assigns/leases IP addresses and related information for temporarily connected devices to provide TCP/IP network configuration, prevent conflicts and centrally organize/manage IP address allocation. Once it receives a reply with an IP address, the client device may send out a gratuitous ARP message to inform the WLAN/other network(s) of its presence.

As noted above, in contrast to the centrally managed client-to-AP mapping techniques disclosed herein, existing client-to-AP mapping approaches typically allow a client device to unilaterally select which AP it will associate with (and thus map to) when it receives probe response messages from two or more APs. This selection is usually based on a comparison (by the client device) of the received signal strengths of the AP beacons and/or response messages. Existing approach are likely to lead to a sub-optimal selection, as exemplified in the example above involving a conference room with six client devices and two APs. There, in contrast to the techniques disclosed herein, the traditional unilateral "client-centric" client-to-AP mapping approach resulted in a significantly decreased (sub-optimal) overall throughput being available to each client device.

Exemplary Process

Figure 3:
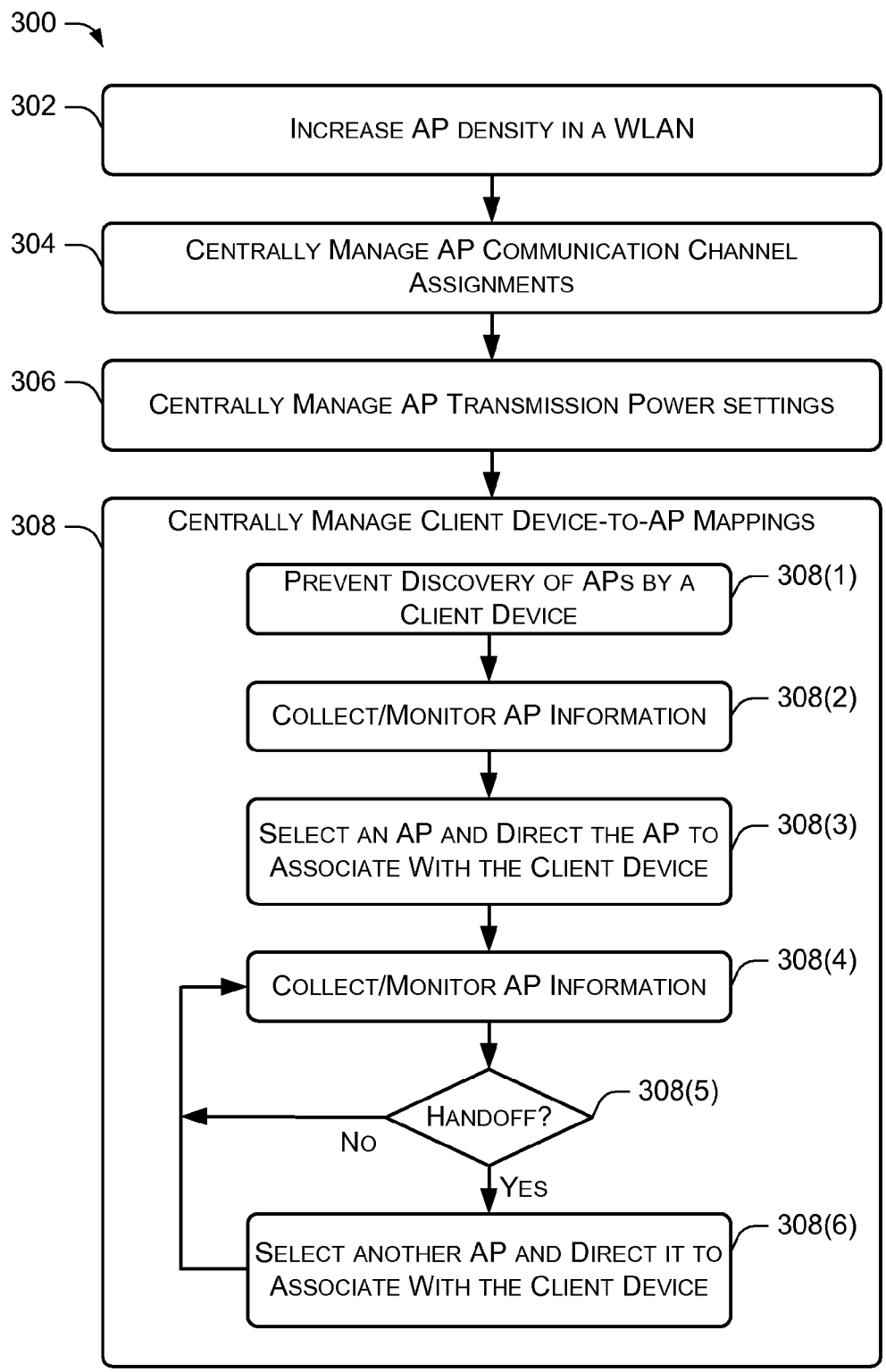
FIG. 3 illustrates an exemplary process for implementing the disclosed techniques, in accordance with at least one embodiment.

FIG. 3 illustrates an exemplary process 300 for implementing the disclosed techniques directed to increasing the throughput capacity on a WLAN, such as WLAN 102 above. Process 300 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. The order in which this process is described is not intended to be construed as a limitation, and any number of the described blocks can be combined in any order to implement the process, or an alternate process. Additionally, individual blocks may be deleted from the process without departing from the spirit and scope of the subject matter described herein.

At block 302, the AP density in a WLAN is increased. While this can be accomplished in any suitable way, in at least some embodiments existing computing devices are modified with AP software (responsible for creating a wireless software AP) along with certain kernel-mode level drivers and a user-mode level daemon, as described above.

As described in detail above, these modifications provide for a fully programmable software AP that can be centrally managed by one or more suitable central controllers based on an "infrastructure-wide" view of available resources. This provides a way in which those AP configurations and client-to-AP mappings that enhance the overall throughput capacity of the WLAN infrastructure can be intelligently identified and selected.

In this regard, at block 304, AP communication channel assignments are centrally managed. As will be appreciated and understood by one skilled in the art, intelligent channel assignment can significantly increase the throughput capacity of APs on a WLAN by mitigating transmission interference between APs and/or client devices. For instance, channel assignment can be used to mitigate transmission interference by maximizing the minimum distance between any two transmitting APs. By way of example and not limitation, various IEEE 802.11 standards provide for multiple orthogonal channels available to APs for transmitting data.

At block 306, the AP transmission power settings are centrally managed. As will be and understood by those skilled in the art, intelligent transmission power management can also increase the throughput capacity of APs on a WLAN by mitigating the transmission interference between APs and/or client devices communicating on the same channel. Typically, this involves tuning down, or decreasing, the transmission power of such devices to decrease the overall interference between the devices.

At block 308, client device-to-AP mappings are centrally managed. As noted above, the intelligent assignment or mapping (initially and periodically thereafter) of client devices to APs by a central controller(s) can dramatically improve throughput capacity. This intelligent mapping can be based on considerations such as physical distance between APs, AP signal strength, load on each AP and interference based conflict graphs.

As noted above, in at least some embodiments, managing client-to-AP mapping involves centrally preventing the discovery of multiple APs in a WLAN by a client device within wireless range of the APs. This effectively prevents the client device from determining (i.e., selecting) which AP it will associate with. As such, 308(1) through 308(6) describe centrally managing client-to-AP mappings with respect to each client device.

At 308(1) the discovery of APs (in the WLAN) by a client device is prevented. This can be accomplished in any suitable way such that the client device is unaware of specific individual APs that are within its transmission range. By way of example and not limitation, in at least some embodiments, the APs are hidden from the client device by being configured to (1) refrain from broadcasting beacon signals that allow the client device to become aware of the AP (by refraining from broadcasting any beacon signals and/or by hiding (i.e., cloaking) the AP's SSID in broadcasted beacon signals such that the AP is not discovered by the client device) and/or (2) refrain from responding to probe request messages from client devices, including those request messages with the SSID set to "ANY"—unless they are instructed to respond. In other words, rather than being configured to broadcast beacon messages (at least those with a discoverable SSID) and respond to probe request messages by default, each individual AP is configured to remain silent and undetected by the client device unless the central controller(s) determines that it should be discovered by the client device.

As noted above, WLANs are dynamic environments where the connectivity and location of client devices can change dramatically over time. Accordingly, with respect to enhancing the throughput capacity available to client devices on the WLAN, it is advantageous to periodically or continuously collect (i.e., receive) and monitor AP information centrally to determine whether the environment has changed such that one or more client device-to-AP mappings should be made (i.e., through association) and/or terminated (i.e., through disassociation). As such, at 308(2) AP information is collected and monitored centrally by the central controller(s). As noted above, this can be accomplished by collecting information from the APs via their software AP daemons, as described above.

At 308(3), an AP is selected and then directed to associate with the client device. In order for an AP to be selected, it receives a probe request message to which it responds to with a probe response message, as described above. The selection of the AP can be accomplished in any suitable way. By way of example and not limitation, in at least some embodiments, the information collected (i.e., received) centrally from the APs is utilized to select a preferable AP. This information is evaluated with respect to one or more association policies to identify a preferable AP that is associated with having certain desirable characteristics (i.e. operational features), such as the most available air time (i.e., the least load burden) and/or the highest average expected data rate between it and the new client device for example. In at least some embodiments, the one or more association policies are embodied as algorithms which can be utilized to process the collected information. By being selected by the central controller(s), the AP is effectively mapped to the client device. As noted above, by centrally managing all of the client device-to-AP mappings, the throughput capacity available to each client device in the WLAN can be dramatically improved.

Once a preferable AP is selected for the client device, the selected AP is directed (i.e., instructed) to associate with the client device to provide the client device with access (i.e., a persistent connection) to the WLAN. This can be accomplished in any suitable way. By way of example and not limitation, in at least some embodiments (as described in detail below), the central controller(s) manages an ACL on the selected AP by instructing the AP (via its software AP daemon) to modify the list (i.e., amend by adding or removing entries). When the AP receives a probe request message from a client, the selected AP refers to its ACL to determine whether it should respond to the probe request message with a probe response message. As such, the central controller(s) effectively directs the selected AP to respond to probe requests from the client (and thus be discovered by the client device), causing the selected AP to be available for association with the client device.

As noted above, it is advantageous to periodically or continuously monitor AP information being collected to centrally determine whether the environment has changed such that one or more client device-to-AP mappings should be changed via handoff (typically disassociation, followed by association). In the context of the AP selected at 308(3), this might involve centrally determining that the client device should be handed off to another AP. As such, at 308(4) AP information continues to be collected and monitored.

At 308(5), a determination is made whether to handoff the client device from the selected AP to another AP. In another words, a determination is made whether to disassociate the selected AP from the client device and replace it with another AP. This determination can be based on any suitable factors(s) and can be accomplished in any suitable way. By way of example and not limitation, in at least some embodiments, the information collected centrally from the APs is utilized to make this determination. In this regard, the information is evaluated with respect to one or more handoff policies to ascertain (1) whether the selected AP (and potentially other APs in the WLAN) are overloaded, and/or whether the client device has moved (with respect to the selected AP and/or other APs in the WLAN) and (2) whether another AP is preferable with respect to associating with the client device. Note that while 308(1) through 308(6) describe centrally managing client-to-AP mappings in the context of a particular client device—in the context of the WLAN as a whole, the collected information can be evaluated with respect to the one or more handoff policies to identify (1) which AP(s) are overloaded, (2) which of the client devices associated with those AP(s) would benefit from being handed off, (3) how often the collected information should be evaluated, and (4) which AP(s) each of the client(s) are to be handed off. These handoff policies will be described in more detail below.

If it is determined at 308(5) that the selected AP should not be handed off to another AP ("No"), AP information continues to be collected and monitored at 308(4). However, if it is determined at 308(5) that the selected AP should be handed off to another AP ("Yes"), at 308(6), another AP is selected and then directed to associate with the client device. In other words, a second access point is selected to replace the first selected access point. The selection of the AP can be accomplished in any suitable way, such as by utilizing the association polices described above.

Once another preferable AP is selected for the client device, the AP is directed to associate with the client device. For this to occur, the previously selected AP, which is associated with the client device, is directed to disassociate from the client device. In this way, the client device is handed off from the AP it was associated with to the most recently selected AP. While this can be accomplished in any suitable way, in at least some embodiments—as described in detail below, this handoff can be accomplished so that the client device's access to the WLAN is not interrupted. Note that once the handoff has completed, AP information continues to be collected and monitored at 308(4).

Exemplary Association Process

Figure 4:
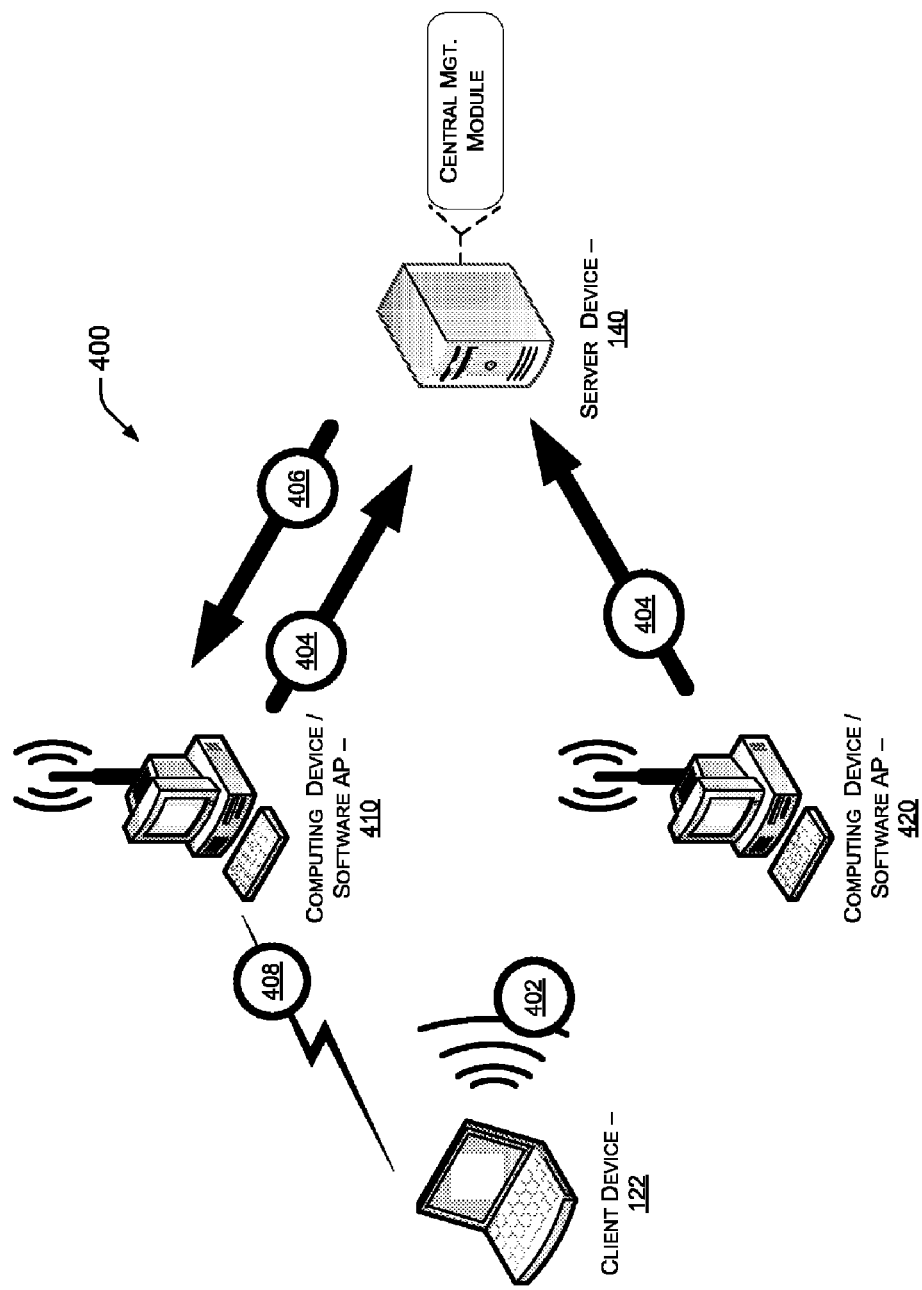
FIG. 4 illustrates an exemplary association process, in accordance with at least one embodiment.

FIG. 4 illustrates an exemplary association process 400 directed to increasing the throughput capacity on a WLAN, in accordance with at least one embodiment. For discussion purposes, process 400 is described in the context of system 100 above as a sequence of operations. In this regard, and for the purposes of this discussion, computing device/software AP 410 and computing device/software AP 420 can be considered computing devices that have been configured as software APs in a manner similar to computing device/software AP 110, described above.

Each operation in process 400 is depicted as a darkened line with one end terminating in a directional pointer. Each operation can be implemented in hardware, software, or a combination thereof. In the context of software, the blocks represent computer instructions that, when executed by one or more processors, perform the recited operations. The order in which each operation is described is not intended to be construed as a limitation, and any number of the described operation can be combined in any suitable order to implement the process, or an alternate process. Additionally, individual suitable operations may be deleted from the process without departing from the spirit and scope of the subject matter described herein.

Recall from above that, by centrally managing client device-to-AP mappings, the throughput capacity available to each client device in the WLAN can be dramatically improved. Also recall that this can be accomplished by preventing the client device from determining which AP (within range) it will associate with. To prevent the client from making this decision, the client device can be barred from discovering which APs are within range by configuring APs in the WLAN so that they do not, by default, (1) advertise their presence by broadcasting beacon signals (by either not broadcasting them at all or by hiding the SSID from the client device) or (2) respond to probe requests automatically, including those requests with the SSID set to "ANY".

At operation 402, client device 122 broadcasts probe request messages to discover which, if any, APs are within range. These messages include a SSID and the client's MAC address, as will be understood and appreciated by one skilled in the art. In this regard, client device 122 can be considered to be attempting to wirelessly connect to WLAN 102. Computing device/software AP 410 and computing device/software AP 420 are within range of client device 122 and capable of providing client device 122 with access to WLAN 102. As such, for the sake of discussion, computing device/software AP 410 and computing device/software AP 420 can be considered "candidates".

At operation 404, computing device/software AP 410 and computing device/software AP 420 (the "candidates") each receive the probe request messages and each check to see if (1) the SSID is appropriate and (2) the MAC address in the message matches a MAC entry in its ACL. Each ACL is managed by the central management module(s) on server device 140 via the software AP daemon on the computing device/software AP. Since managing these ACLs includes determining which MAC addresses are added-to and/or subtracted-from the ACL, the central management module(s) centrally controls which client device(s) each AP in WLAN 102 associates with. Here, the SSID matches but the MAC address does not match an entry in either of the ACLs on the computing devices/software APs. This is because the central management module(s), relying on the fact that the client device's MAC is not in the ACLs to prevent the client from discovering the APs on WLAN 102- and selecting an AP to associate with, has not instructed computing device/software AP 410 or computing device/software AP 420 to add the client device's MAC to their respective ACLs. In other words, if the SSID was appropriate and the MAC address in the client device's probe request message matched an entry in one or both of the computing devices/software APs, the computing devices/software AP with the matching entry would immediately respond to the probe request message and thus be discovered by the client device (which could then to decide whether or not to associate with it).

As will be understood and appreciated by one skilled in the art, computing device/software AP 410 and computing device/software AP 420 each inform the central management module(s) about receiving the probe request messages and the MAC address included in the messages. Assuming that the client device broadcasts a probe request message with an SSID that is appropriate, at operation 406, upon being informed of the probe request messages received by the computing devices/software APs, the central management module(s) (i.e., central controller) uses AP information it has collected to determine (i.e., select) which AP should associate to with the client device. As noted above, this can include evaluating the collected information with respect to one or more association policies to identify which AP "candidate" is associated with certain desirable characteristics, such as having certain desirable characteristics, such as the most available air time (i.e., the least load burden) and/or the highest average expected data rate between it and the new client device for example. In at least some embodiments, these characteristics can be represented as one or more values. In at least some embodiments, these association policies are embodied as one or more algorithms that can be utilized to process the collected information.

Once the central management module(s) has selected a "candidate", it directs the candidate (via the software AP daemon on the candidate, as described above) to associate with client device 122. Specifically, assuming the selected candidate is computing device/software AP 410, the central management module(s) sends a message to computing device/software AP 410 instructing (i.e. directing) it to add the MAC address for client device 122 to its ACL list.

At operation 408, upon receiving the next probe request message from client device 122, computing device/software AP 410 (the "selected candidate") will check to see if the client device's MAC address matches an entry in its ACL. Assuming the computing device/software AP 410 followed the central management module's instructions and added the client device's MAC address to its ACL, it finds a match and replies with a unicast probe response message thus initiating the association process.

Exemplary Handoff Process

Figure 5:
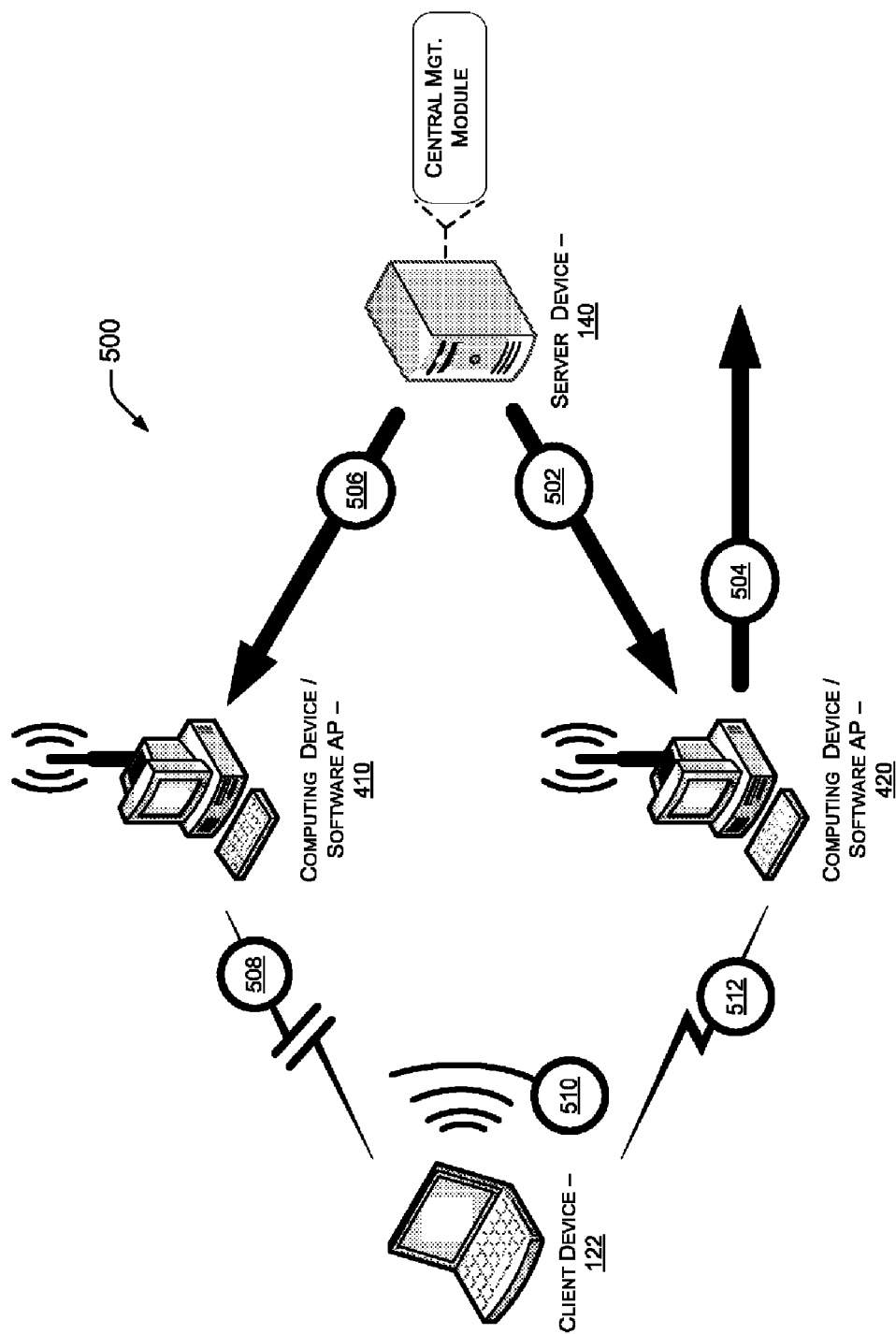
FIG. 5 illustrates an exemplary handoff process, in accordance with at least one embodiment.

FIG. 5 illustrates an exemplary handoff process 500 directed to increasing the throughput capacity on a WLAN, in accordance with at least one embodiment. For discussion purposes, process 500 is described in the context of system 100 above as a sequence of operations. In this regard, ad for the purposes of this discussion, computing device/software AP 410 and computing device/software AP 420 can be considered computing devices in WLAN 102 that have configured as software APs in a manner similar to computing device/software AP 110, described above.

Each operation in process 500 is depicted as a darkened line with one end terminating in a directional pointer. Each operation can be implemented in hardware, software, or a combination thereof. In the context of software, the blocks represent computer instructions that, when executed by one or more processors, perform the recited operations. The order in which each operation is described is not intended to be construed as a limitation, and any number of the described operation can be combined in any suitable order to implement the process, or an alternate process. Additionally, individual suitable operations may be deleted from the process without departing from the spirit and scope of the subject matter described herein.

Recall from above that WLANs are dynamic environments where the connectivity and location of client devices can change dramatically over time. This is especially true with WLAN 102 which has a relatively dense infrastructure of wireless APs. Accordingly, with respect to enhancing the throughput capacity available to client devices on WLAN 102, it is advantageous to monitor AP information being collected to centrally determine whether a client device associated with an AP (the "associated AP") should be handed off to another AP. While this can be determined in any suitable way, in at least some embodiments this can include evaluating the collected information with respect to one or more handoff policies directed to determine (1) when the associated AP and/or other APs in WLAN 102 are overloaded (i.e., when the load on an AP exceeds a certain designated threshold) and/or (2) if a client device of interest has moved within WLAN 102. In at least some embodiments, the one or more handoff policies are embodied as one or more algorithms that can be utilized to process the collected information.

When it is determined that a handoff is warranted, it is also advantageous to transparently hand off client devices so that their persistent connection to WLAN 102 remains uninterrupted—without requiring any modifications to client devices. As such process 500 describes a series of operations for transparently handing off client device 122 from device/software AP 410 to computing device/software AP 420. These handoffs are initiated, controlled and otherwise managed centrally by the central management module(s) on server device 140. As such, these handoffs can be characterized as "explicit handoffs" rather than "implicit handoffs" where client devices are responsible for initiating and managing their own handoffs.

At operation 502, the central management module(s) (i.e., central controller(s)), having determined that client device 122 should be handed off from device/software AP 410 to computing device/software AP 420 (as described above), sends a message to computing device/software AP 420 instructing (i.e. "directing") it to add the MAC address for client device 122 to its ACL list.

At operation 504, the central management module(s) sends a message to computing device/software AP 420 instructing (i.e. "directing") it to send out a proxy gratuitous ARP to update various devices on WLAN 102, and any networks communicatively linked to WLAN 102—such as backhaul network 130. This proxy gratuitous ARP is essentially a gratuitous ARP sent on behalf of client device 122 which, as will be appreciated and understood by one skilled in the art, causes any future communications directed to client device 122 to be routed to computing device/software AP 420 rather than to computing device/software AP 410.

At operation 506, the central management(s) module sends a message to computing device/software AP 410 instructing it to send a disassociate message to client device 122. As such, at operation 508 computing device/software AP 410 removes the MAC address for client device 122 from its ACL and sends a disassociation message to client device 122. In addition, as will be appreciated and understood by one skilled in the art, computing device/software AP 410 performs all activities necessary for it to become disassociated from client device 122. Note that communications directed to client device 122 have been routed to computing device/software AP 420 ever since it sent the proxy gratuitous ARP.

At operation 510, client device 122 receives the disassociate message from computing device/software AP 410 and immediately begins to scan for other APs associated with the same SSID by broadcasting probe request messages designating that SSID. At operation 512, upon receiving a probe request message broadcasted by client device 122, computing device/software AP 420 responds with a probe response message—thus initiating association with client device 122. Note that by virtue of the fact that computing device/software AP 420 is able to associate with client device 122 without causing a local media-disconnect, client device 122 does not send out a DHCP request and can continue using the same communicative session/IP address. In other words, since the time taken to disassociate (from computing device/software AP 410) and associate (with computing device/software AP 420) is less than the local media-disconnect timeout time on client device 122, the persistent connection to WLAN 102 enjoyed by client device 122 is not disturbed.

Exemplary Association Policy

The following example algorithm provides but one way that an association policy can be implemented. This algorithm constitutes but one exemplary implementation of the association policies described above.

1: ExpectedRate (x,y)=Average data rate expected between client x and AP y
2: FreeAirTime(y)=Free airtime on AP y
3: C=new client
4: $AP_{list}$=APs that hear C within the 85th percentile of maximum RSSI
5: Pick AP∈APlist that maximizes Expected Rate (C, AP)*FreeAirTime (AP)
6: C associates with AP
AP=Access List
RSSI=received signal strength indication Note that the exemplary algorithm above involves representing each potential association between each available AP ("candidate") identified in "APlist" and a new client device "C" as a single number representing the available throughput capacity of the AP. In this regard, the general approach taken by this algorithm is to select a certain number of APs within range of a new client device. The APs in this group ($AP_{list}$) are selected based on the strength of signal(s)/message(s) received from them (i.e., RSSI)—which typically correlates with the proximity of the AP to the new client device. In other words, the RSSI of the signal(s)/message(s) received from an AP in this group exceed a certain signal strength threshold (within the 85th percentile of maximum RSSI in the above algorithm). Once the group of APs are selected, each AP ("candidate") is assigned a single value (i.e., number) based on the product of values associated with its operational features. Specifically, the single value in the above algorithm is defined by the product of (1) the average expected data rate (ExpectedRate) between it and the new client device (expressed as a ExpectedRate value) and (2) the free air time it has available for the new client device (expressed as its FreeAirTime value). In other words, each AP is associated with a value that is calculated by multiplying its ExpectedRate by its FreeAirTime, as will be appreciated and understood by one skilled in the art.

As noted above, this single value assigned to each AP (in the selected group) is intended to represent the available throughput capacity of that AP. This single value can be used uniformly for comparing various possible APs ("candidates") to identify (i.e., select) a preferable AP (having the highest single value) to associate with the new client device C. By assigning a value to each available AP, the preferred AP is effectively selected as a function of the value, which can be updated over time such that another AP can be chosen in the future. The intuition behind this approach is based on the conservative assumption that each new client device C shall use as much free capacity as it can get. Hence, it needs to be assigned to an AP that can potentially give it the most enhanced throughput capacity.

With respect to the FreeAirTime, it is a function defined by 1—AirTimeUsed, wherein AirTimeUsed is the air-time utilization normalized across a certain time duration. This duration can be any length (such as five seconds in at least one embodiment), as will be appreciated and understood by one skilled in the art. As such, each AP's free air time can be thought of as a measure of the load which that AP is burdened with. Information associated with the AirTimeUsed is provided by each AP to the central controller. This FreeAirTime can be thought of as the available air time a particular client device can expect to receive when connected to a particular AP. In other words, from the perspective of a particular AP, the wireless channel capacity in the vicinity of the AP is consumed by certain activities: packets being sent by the AP, packets being sent to the AP and transmission interference from other sources (e.g. client devices associated with other APs nearby). The remaining channel capacity is the free air time. The air time utilization, and thus the AirTimeUsed and FreeAirTime, can be determined by utilizing certain techniques, such as those described in co-pending patent application Ser. No. 11/753,536, filed May 24, 2007 and assigned to Microsoft Corporation in Redmond, Wash.

With respect to ExpectedRate, it is a function that is calculated in situ on an online basis. Intuitively it is the average data rate a particular client device can expect to receive when connected to a particular AP. The ExpectedRate function can be calculated periodically in the following way. As will be appreciated and understood by one skilled in the art, each AP broadcasts packets at various data rates and keeps track of all broadcast packets it has received from other APs—recording the received signal strength indication (RSSI) and the particular data rate for each packet. Broadcast packets are not retransmitted and hence the reception rate of packets at every AP when sent out at a particular rate from every AP can be used to a build a rate mapping that depicts the relationship between RSSI and reception rate for a given data rate.

The outcome of the process of building such a rate map is an approximate relationship between RSSI and data rate (i.e., if an AP hears from a client at a given RSSI value, what is the expected average data rate "ExpectedRate" between the two?). This rate map can be used as a rough approximation rather than a precise metric. Furthermore, even if a poor selection is made utilizing this algorithm, the ramifications will be mitigated by the use of the load balancing policies described in detail below.

Exemplary Handoff Policies for Load Balancing

Recall that to balance the load placed on each AP in a dynamically ever-changing WLAN, certain handoff policies can be utilized to evaluate information collected from the APs in the WLAN. As noted above, in the context of the WLAN as a whole, the collected information can be evaluated with respect to certain handoff policies to identify (1) which AP(s) are overloaded, (2) which of the client devices associated with those AP(s) would benefit from being handed off, (3) how often the collected information should be evaluated, and (4) which AP each of the client devices are to be handed off. Certain exemplary handoff polices for load balancing are described below with respect to identifying (1)-(4) for each client device and/or AP in a WLAN, in accordance with at least some embodiments.

With respect to (1), identifying which AP(s) are overloaded, an AP is considered to be overloaded if the utilization of the wireless channel that the AP is on exceeds a defined percentage, such as 80% in some embodiments, of the load on the AP. This load can be determined by certain measurement techniques, such as those described in Patent Application Publication Number US200610215574, filed Mar. 24, 2005 and assigned to Microsoft Corporation in Redmond, Wash.

Client devices associated with an overloaded AP on a WLAN may benefit by being handed off to another AP capable of providing the client device with a higher throughput. Alternatively or additionally, clients remaining associated with the overloaded AP will benefit because the burden on the overloaded AP will be diminished.

With respect to (2), identifying which of the client devices associated with those AP(s) would benefit from being handed off, all client devices associated with overloaded AP(s) are considered in the order of the AP air time they are consuming. In this regard, a client device is considered a device that would benefit from being handed off from an overloaded AP if the client device is bottlenecked on the overloaded AP. Additionally or alternatively, for a client device to be considered a device that would benefit from being handed off, there should be an available candidate AP (for the client device to be handed off to) that is capable of providing the client device with an improved throughput capacity (i.e., a candidate AP should allow the client device to pump more data). In other words, in the context of the exemplary association policy above, the product of the free air time (FreeAirTime) and the expected average data rate (ExpectedRate) of the candidate AP should be greater than that being made available by the AP that is already associated with the client device. In at least some embodiments, a client device handoff could be considered inappropriate unless the throughput capacity available to the client device (on the candidate AP) could be improved by a certain fraction (e.g., 20%). This would minimize handoffs due to small fluctuations in loads and/or interference levels.

With respect to (3), identifying how often the collected information should be evaluated, this evaluation can be performed continuously. With respect to continuously evaluating, in at least some embodiments overloaded APs are considered based on the size of the load placed on them. In addition, each of the client devices associated with an overloaded AP are considered in an order based upon the airtime demand they place on the overloaded AP. Furthermore, once a client device is handed off to another AP, the client device is not eligible to be handed of again for a certain period of time, such as one minute for example. This prevents unnecessarily handing off of client devices due to small fluctuations in load and interference on the WLAN. Finally, to allow the effects of the handoff to be realized, APs involved in a handoff are not involved in any additional handoffs for a defined period, such as one minute for example.

With respect to (4), identifying which AP(s) each of the client(s) are to be handed off, a bottlenecked client device should be moved to another AP only if there is some chance that it will no longer be bottlenecked. In other words, for a handoff to be warranted, the destination AP should be able provide the bottlenecked client device with an enhanced throughput capacity (which, in at least some embodiments, is the product of an AP's free air time and average expected data rate). Furthermore, by utilizing one or more suitable association policies, such as the exemplary association policy described above, the destination AP associated with the most enhanced throughput capacity can easily be identified and selected. Practically speaking, a defined threshold for enhanced throughput capacity can be set (e.g., 20%) to minimize handoffs due to small fluctuations in load and interference in the WLAN. However, this might not always be desired. For instance, if it is decided that handing off a particular client device will benefit the throughput capacity of one or other client devices in the WLAN, an equivalent throughput capacity might be sufficient to justify a handoff.

Exemplary Handoff Policies for Client Device Movement

Recall that to balance the load placed on each AP in a dynamically ever-changing WLAN, certain handoff policies can be utilized to evaluate information collected from the APs in the WLAN. In the context of the WLAN as a whole, the collected information can be evaluated with respect to certain handoff policies to determine whether the client device has moved to a new location within the WLAN and whether to handoff the client device to another AP. Certain exemplary handoff polices for client device movement are described below for each client device in a WLAN, in accordance with at least one embodiment.

With respect to determining whether the client device has moved to a new location within the WLAN, this can be performed at any suitable time and frequency (e.g., every 30 seconds). Furthermore, in determining whether a particular client device has physically moved within the WLAN, any suitable location technique(s) can be employed. In at least some embodiments, location estimation techniques are employed that are described in co-pending patent application Ser. No. 11/753,536, filed May 24, 2007 and assigned to Microsoft Corporation in Redmond, Wash. In this regard, any suitable threshold distance (e.g., 10 or more meters) can be used to determine whether or not the client device's physical movement should justify performing a handoff (i.e., (2) above).

With respect to determining whether to handoff the client device to another AP, this can be accomplished by evaluating whether another AP will be able provide the client device that has moved with an enhanced throughput capacity (which, in at least some embodiments, is the product of an AP's free air time and average expected data rate). Furthermore, by utilizing suitable association policies, such as the exemplary association policy described above, the destination AP associated with the most enhanced throughput capacity can easily be identified and selected. Practically speaking, a defined threshold for enhanced throughput capacity can be set (e.g., 20%) to minimize handoffs that would not lead to justifiable improvements in the throughput capacity available to the client device. However, this might not always be desired. For instance, if it is decided that handing off a particular client device will benefit the throughput capacity of one or other client devices in the WLAN, an equivalent throughput capacity might be sufficient to justify a handoff.

Extension

With the techniques described above, the central controller(s) determines which AP the client is allowed to associate with. It is therefore important for the central controller(s) to detect any AP that is malfunctioning, so it can avoid assigning clients to that AP. Any suitable criteria can be employed in determining whether an AP is considered to be malfunctioning. By way of example and not limitation, in at least some embodiments, an AP is considered to be malfunctioned if one or more clients fail to associate with the AP within an acceptable period of time. Additionally or alternatively, an AP that is able to associate with one or more clients within an acceptable period of time may nevertheless be considered to be malfunctioning if that AP fails to provide a certain level of service (e.g., throughput) to the one or more client devices.

Practically speaking, any suitable process and/or policy(ies) can be utilized with respect to detecting any AP that is malfunctioning. By way of example and not limitation, consider a client device that has been assigned to a certain AP associated with a WLAN. In this regard, utilizing the techniques described above, a central controller(s) can start a timer when the client device is assigned to the AP. If, within a specified period (e.g., 30 seconds), the certain AP does not report that the client device has successfully associated with it, the central controller(s) can take the following steps. First, it adds the certain AP to a list of undesirable APs for the client device. Next, it attempts to find another AP (i.e. one that does not feature in the undesirable list for this client) to assign to the client device to. At the same time, it increases a special counter for the certain AP, called the failure count. If the failure count reaches a certain threshold value (e.g., 5) within a specified time (e.g., 1 hour for), the certain AP is marked as malfunctioning, and the system administrator is notified. This can potentially be performed with respect to each AP and each client device associated with the WLAN. As such, the failure count for each AP, as well as the undesirable AP list associated with each client, can be purged at regular intervals.

Conclusion

Although embodiments of techniques for increasing the throughput capacity available to client devices, such as mobile devices, connected to a wireless local area network (WLAN) have been described in language specific to structural features and/or methods, it is to be understood that the subject of the appended claims is not necessarily limited to the specific features or methods described. Rather, the specific features and methods are disclosed as exemplary implementations.

What is claimed is:

1. A method comprising:
   configuring multiple desktop computers into multiple wireless access points (APs), the configuring comprising:
   attaching each of the multiple desktop computers to a wired network;
   attaching each of the multiple desktop computers to a wireless local area network (WLAN);
   operating, on each of the multiple desktop computers, software to accommodate information requests over the wireless local area network, to receive and execute commands from a central management module on a server, and to communicate with the wired network;
   centrally preventing discovery of multiple APs in the WLAN by a client device within wireless range of the multiple wireless APs; and
   centrally selecting a wireless AP from the multiple APs to associate with the client device to provide the client device with a wireless connection to the WLAN.

2. A method as recited in claim 1, wherein the preventing discovery of multiple wireless APs comprises hiding the multiple APs from the client device.

3. A method as recited in claim 2, wherein the hiding comprises configuring the multiple wireless APs to:
   refrain from broadcasting beacon signals that allow the client device to become aware of the multiple wireless APs;
   refrain from responding to probe request messages from the client device unless instructed to respond to the probe request messages.

4. A method as recited in claim 3, wherein configuring the multiple wireless APs to refrain from broadcasting beacon signals that allow the client device to become aware of the multiple wireless APs comprises one or both of:
   configuring the multiple wireless APs to refrain from broadcasting beacon signals; and
   configuring the multiple wireless APs to refrain from broadcasting beacon signals that include a service set identifier (SSID).

5. A method as recited in claim 1, wherein one or more of the centrally preventing and the centrally selecting are performed at least in part by one or both of:
   a server device communicatively linked to the multiple wireless APs; and
   one or more of the multiple wireless APs.

6. A method as recited in claim 1, wherein the centrally selecting comprises:
   collecting information from one or more of the multiple APs; and
   evaluating the collected information according to one or more association policies to identify a suitable AP.

7. A method as recited in claim 1, further comprising centrally directing the wireless AP to associate with the client device by instructing the wireless AP to respond to one or more probe requests from the client device.

8. A method as recited in claim 7, wherein instructing the wireless AP to respond to one or more probe requests comprises causing the wireless AP to add the client device's media access control (MAC) address to an access control list (ACL) on the wireless AP.

9. A method as recited in claim 1, further comprising handing off the client device without interrupting the wireless connection to the WLAN, wherein the handing off of the client device comprises:
   centrally directing the wireless AP to disassociate from the client device, wherein the wireless AP is a first wireless AP;
   centrally selecting a second wireless AP from the multiple APs to associate with the client device to provide the client device with an enhanced connection to the WLAN; and
   centrally directing the second wireless AP to associate with the client device by one or both of:
   instructing the second wireless AP to respond to one or more probe requests from the client and;
   instructing the second wireless AP to send a proxy gratuitous address resolution protocol (ARP) message to the WLAN on behalf of the client device.

10. A method as recited in claim 1, further comprising centrally preventing discovery of multiple APs in a WLAN, wherein at least a portion of the multiple APs comprise software APs, and wherein the software APs are communicatively linked to the WLAN and to one or more backhaul networks.

11. A method comprising:
increasing access point (AP) density in a wireless network, the increasing performed by configuring a plurality of desktop computers to function as a plurality of wireless access points (APs), the configuring comprising:
attaching each of the multiple desktop computers to a wired network;
attaching each of the multiple desktop computers to a wireless local area network (WLAN);
operating, on each of the multiple desktop computers, user mode software comprising a software AP daemon to accommodate information requests and to receive and execute commands from a central management module on a server device; and
operating, on each of the multiple desktop computers, kernel mode software comprising a software AP driver in communication with the software AP daemon and in communication with a driver in communication with the wired network;
determining, at the server device, that a first AP providing a client device with a persistent connection to the wireless local area network (WLAN) should disassociate from the client device;
selecting, at the server, a second AP to associate with the client device to provide the client device with wireless access to the WLAN; and
directing, at the server, the first AP to disassociate from the client device and the second AP to associate with the client device, the directing performed without interrupting the persistent connection and performed by commands issued to at least a software AP daemon operating on the second AP.

12. A method as recited in claim 11, wherein the determining comprises one or more of the following:
ascertaining, based on one or more policies, that the first AP is overloaded;
ascertaining, based on one or more policies, that the client device has moved; and
ascertaining, with respect to one or more policies, that it would be advantageous for the client device to associate with another AP capable of providing the client device with access to the WLAN.

13. A method as recited in claim 11, wherein the selecting comprises selecting the second AP from a plurality of available APs based on one or more policies.

14. A method as recited in claim 11, wherein the directing comprises one or both of:
instructing the second AP to add an entry identifying the client device to a list on the first AP, wherein the instructing causes the second AP, in response to receiving a probe request message from the client device, to send a probe response message to the client device; and
instructing the second AP to broadcast a proxy gratuitous address resolution protocol (ARP) message to the WLAN on behalf of the client device.

15. A method as recited in claim 14, wherein the first AP disassociates from the client device and the second AP associates with the client device before the client device drops the persistent connection.

16. A system comprising:
a plurality of desktop computers, configured into multiple wireless access points (APs), by configurations comprising:
a wired network interface card within each of the plurality of desktop computers, attaching a respective desktop computer to a wired network;
a wireless network interface card attaching each of the multiple desktop computers to a wireless local area network (WLAN);
a user mode module, on each of the multiple desktop computers, comprising a software AP daemon to accommodate information requests and to receive and execute commands from one or more central management modules on a server device; and
a first kernel mode module, on each of the multiple desktop computers, comprising a software AP driver in communication with the software AP daemon and in communication with service request protocols and network bridging processes;
a second kernel mode module, on each of the multiple desktop computers, comprising a wireless interface driver, in communication with the wireless interface card;
a third kernel mode module, on each of the multiple desktop computers, comprising a wired interface driver, in communication with the wired interface card and the service request protocols and the network bridging processes; and
the one or more central management modules being distributed over one or more computing devices communicatively coupled to a network, the one or more central management modules comprising:
a storage component to store information received from multiple nodes providing wireless access to the network, wherein the multiple nodes are configured to be unavailable to a client device;
a selection component to process the information utilizing one or more algorithms and, based on the processed information, select a certain node from the multiple nodes to provide the client device with wireless access to the network; and
a communication component to configure the certain node to become available to the client device.

17. A system as recited in claim 16, wherein at least a portion of the multiple nodes are software access points (AP), one or more individual software APs being implemented on a computing device with a backhauled connection to the network.

18. A system as recited in claim 16, wherein the multiple nodes are communicatively coupled to form a wireless local area network (WLAN) following Institute of Electrical and Electronics Engineers (IEEE) 802.11 communication standards.

19. A system as recited in claim 16, wherein the multiple modes are configured to be unavailable to the client device by causing each individual node of the multiple nodes to:
refrain from broadcasting beacon signals that identify the individual node; and
refrain from responding to probe request messages from the client device unless instructed to respond.

20. A system as recited in claim 16, wherein the certain node is configured to become available to the client device by instructing the node to respond to one or more probe request messages from the client device.

* * * * *